(12) United States Patent
You (10) Patent No.: US 12,353,732 B2
(45) Date of Patent: Jul. 8, 2025

(54) MEMORY CONTROLLER, MEMORY DEVICE AND STORAGE DEVICE INCLUDING THE SAME

(71) Applicant: SK hynix Inc., Icheon-si (KR)

(72) Inventor: Ho Ryong You, Icheon-si (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/360,131

(22) Filed: Jul. 27, 2023

(65) Prior Publication Data

US 2024/0036746 A1 Feb. 1, 2024

(30) Foreign Application Priority Data

Jul. 27, 2022 (KR) .................. 10-2022-0093147

(51) Int. Cl.
*G06F 3/06* (2006.01)
*G06F 11/00* (2006.01)

(52) U.S. Cl.
CPC .......... *G06F 3/0625* (2013.01); *G06F 3/0659* (2013.01); *G06F 3/0679* (2013.01); *G06F 11/004* (2013.01)

(58) Field of Classification Search
CPC .... G06F 3/0625; G06F 3/0659; G06F 3/0679; G06F 11/004; G06F 3/0632; G06F 3/0634; G06F 11/1048; G06F 3/0653; G06F 3/0658
See application file for complete search history.

(56) References Cited

U.S. PATENT DOCUMENTS

| 2018/0365022 A1* | 12/2018 | Varma ................... G06F 9/4403 |
| 2019/0220228 A1* | 7/2019 | Kim ....................... G06F 3/0605 |
| 2023/0297277 A1* | 9/2023 | Moshe .................. G06F 3/0632 |
| | | 711/154 |

FOREIGN PATENT DOCUMENTS

| CN | 109074296 A | * 12/2018 | .......... G06F 1/3287 |
| CN | 114155907 A | * 3/2022 | .......... G06F 3/0604 |
| KR | 10-2016-0129965 A | 11/2016 | |
| KR | 10-2019-0086927 A | 7/2019 | |

* cited by examiner

*Primary Examiner* — Masud K Khan
(74) *Attorney, Agent, or Firm* — IP & T GROUP LLP (57) ABSTRACT

A storage device of the present disclosure includes a memory device including a system memory storing system information used in an operation, and a register storing a register value indicating that the system information is a first state or a second state, and a memory controller configured to control the memory device to receive the register value from the memory device when power is turned on, and to initialize the system information stored in the system memory when the received register value indicates that the system information is the first state.

9 Claims, 10 Drawing Sheets

MEMORY CONTROLLER, MEMORY DEVICE AND STORAGE DEVICE INCLUDING THE SAME

CROSS-REFERENCE TO RELATED APPLICATION

The present application claims priority under 35 U.S.C. § 119(a) to Korean patent application number 10-2022-0093147 filed on Jul. 27, 2022, the entire disclosure of which is incorporated by reference herein.

BACKGROUND

1. Field of Invention

Embodiments of the present disclosure relate to an electronic device, and more particularly, to a memory controller, a memory device, and a storage device including the same.

2. Description of Related Art

A storage device is a device that stores data under control of a host such as a computer or a smart phone. The storage device may include a memory device that stores data and a memory controller that controls the memory device.

The host may supply power to the memory device and the memory controller. However, when the power supplied to the memory controller is cut off and then supplied again in a state in which the power supplied to the memory device is maintained, the memory controller may determine that the memory device is in an initialized state although the memory device is not initialized. This may result in a boot error.

SUMMARY

Embodiments of the present disclosure provide a memory controller, a memory device, and a storage device including the same for preventing a boot error.

A storage device according to an embodiment of the present disclosure may include a memory device including a system memory configured to store system information used for operations of the memory device, and a register configured to store a register value indicating whether the system information is a first state or a second state, and a memory controller configured to receive the register value from the memory device when power is turned on, and control the memory device to initialize the system information stored in the system memory when the received register value indicates that the system information is the first state.

A memory controller according to an embodiment of the present disclosure may include a memory interface configured to receive a register value indicating a state of system information from a memory device, and a processor configured to determine whether the system information is in an initialization state according to the received register value when power is turned on, and control the memory interface to transmit a command for initializing the system information to the memory device when the system information is not in the initialization state.

A memory device according to an embodiment of the present disclosure may include a system memory configured to store system information used for operations of the memory device, a register configured to output a register value indicating whether the system information is in an initialization state in response to a register read command, and a reset operation controller configured to determine whether to perform an initialization operation of initializing the system information stored in the system memory according to a past reception history of a first reset command when the first reset command is received from the memory controller, and perform the initialization operation when a second reset command is received from the memory controller after a first value indicating that the system information is not in the initialization state is output as the register value.

According to embodiments of the present disclosure, a memory controller may accurately and quickly recognize whether a memory device is in an initialization state. According to embodiments of the present disclosure, power efficiency and latency efficiency may be improved by controlling a memory device to perform an initialization operation only in a necessary situation.

DETAILED DESCRIPTION

Specific structural or functional descriptions of embodiments according to the concepts which are disclosed in the present specification are illustrated only to describe the embodiments according to the concept of the present disclosure, the embodiments according to the concept of the present disclosure may be carried out in various forms and should not be construed as being limited to the embodiments described in the present specification.

Since various modifications and changes may be applied to the embodiments according to the concept of the present disclosure and the embodiments according to the concept of the present disclosure may have various forms, the specific embodiments will be illustrated in the drawings and described in the present specification. However, it should be understood that the embodiments according to the concept of the present disclosure are not construed as limited to a specific disclosure form and include all changes, equivalents, or substitutes that do not depart from the spirit and technical scope of the present disclosure.

Figure 1:
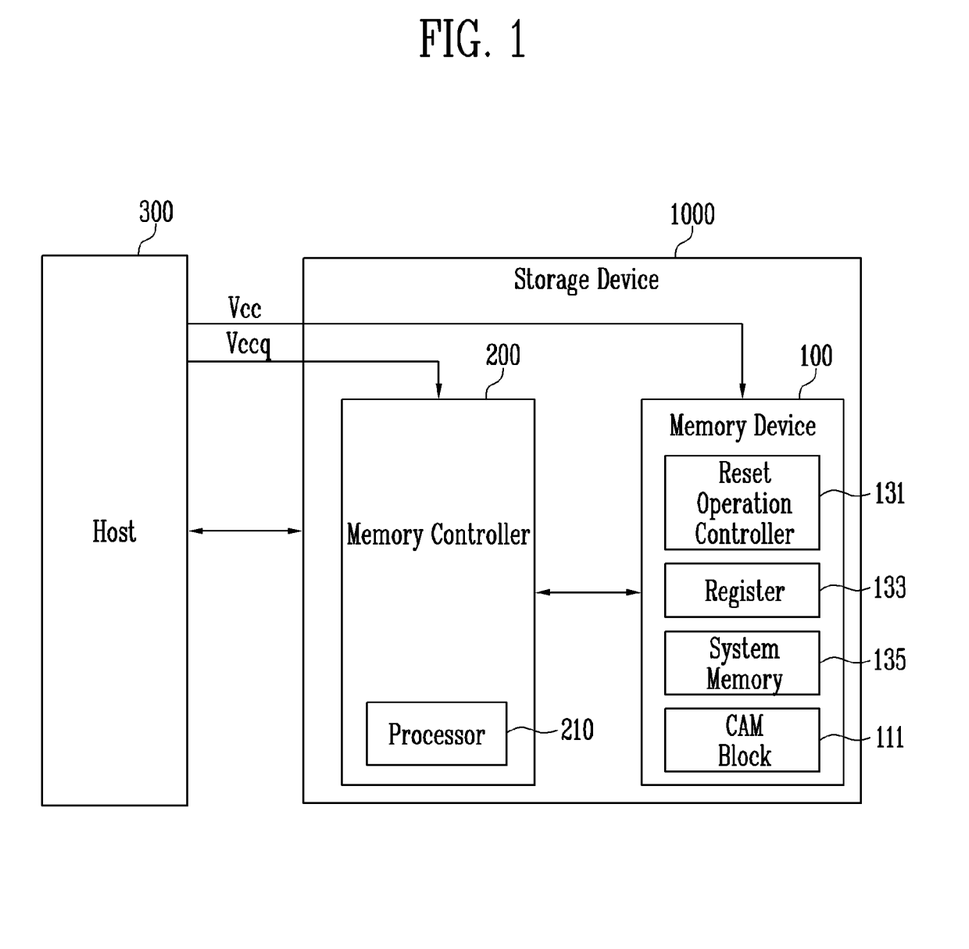
FIG. 1 is a diagram illustrating a storage device according to an embodiment of the present disclosure.

FIG. 1 is a diagram illustrating a storage device 1000 according to an embodiment of the present disclosure.

Referring to FIG. 1, the storage device 1000 may store data. The storage device 1000 may be implemented as any of various types of electronic devices according to a communication standard or a method of storing data. For example, the storage device 1000 may be implemented as any one of a solid state disk (SSD), a multi-media card (MMC), an embedded MMC (eMMC), a reduced-size MMC (RS-MMC), a micro-MMC, a secure digital (SD), a mini-SD, a micro-SD, a universal serial bus (USB) storage device, a universal flash storage (UFS) device, a personal computer memory card international association (PCMCIA) storage device, a peripheral component interconnection (PCI) storage device, a PCI express (PCI-E) storage device, a network attached storage (NAS), and a network storage device. Here, the enumerated examples are merely exemplary, and the present disclosure is not limited thereto, and the storage device 1000 may be implemented as various electronic devices.

The storage device 1000 may operate according to a request received from a host 300. Specifically, the storage device 1000 may perform an operation corresponding to the request received from the host 300. For example, when data and a request for instructing to store the data are received from the host 300, the storage device 1000 may store data in the storage device 1000. As another example, when a request for instructing to read data is received from the host 300, the storage device 1000 may provide the data stored in the storage device 1000 to the host 300.

The host 300 may be one of various electronic devices such as a desktop computer, a laptop computer, a mobile phone, a smart phone, a game machine, a television (TV), a tablet computer, and a wearable device. The host 300 may request the storage device 1000 to store data, read data, and erase data through communication of various communication standards. The storage device 1000 may be mounted inside the host 300 or implemented as an external electronic device of the host 300.

The storage device 1000 may include a memory device 100 and a memory controller 200. Here, the memory device 100 and the memory controller 200 may be connected through a channel to communicate with each other. Meanwhile, the storage device 1000 may include one or more memory devices. The storage device 1000 may receive first power Vcc and second power Vccq from the host 300 or another external power source. Here, the first power Vcc may be supplied to the memory device 100 as a power voltage of the memory device 100. The second power Vccq may be supplied to the memory controller 200 as a power voltage of the memory controller 200. For example, the first power Vcc may have a level of 3.3V, and the second power Vccq may have a level of 1.8V or 3.3V. However, this is merely an embodiment and a level of a voltage may be variously modified.

The memory device 100 may store data. The memory device 100 may include a plurality of memory blocks capable of storing data. The memory controller 200 may control operations of the memory device 100.

When a request and a logical address are received from the host 300, the memory controller 200 may convert the logical address into a corresponding physical address and control the memory device 100 to perform an operation corresponding to the request on a storage position indicated by the physical address. For example, the request may be a write request, a read request, an erase request, and the like. An operation corresponding to the write request may be a program operation of storing data. An operation corresponding to the read request may be a read operation of outputting stored data. An operation corresponding to the erase request may be an erase operation of erasing stored data.

In an embodiment, the memory device 100 may include a content addressable memory (CAM) block 111, a reset operation controller 131, a register 133, and a system memory 135.

The CAM block 111 may store default system information of the memory device 100. The default system information may indicate an initialization state of system information. The system information may include a plurality of parameters used for operations of the memory device 100. The parameter may indicate a level of a voltage used in each operation such as a program operation, a read operation, or an erase operation. For example, the parameter may be one of a level of a program voltage, a level of a program pass voltage, a level of a program verify voltage, a level of a program allow voltage, a level of a program inhibit voltage, a level of a read voltage, a level of an erase voltage, and a level change amount of a voltage. The default system information may include parameters of an initialization state. That is, the default system information may include parameters having an initial setting value.

The reset operation controller 131 may perform an initialization operation of the memory device 100 in response to a command received from the memory controller 200. Here, the initialization operation may be an operation of loading the default system information stored in the CAM block 111 into the system memory 135. That is, the reset operation controller 131 may store, in the system memory 135 as the system information, the default system information stored in the CAM block 111.

The register 133 may store a register value and output the register value to the memory controller 200. The register value may indicate whether the system information stored in the system memory 135 is in a first state or a second state. A register value having a first value may indicate that the system information stored in the system memory 135 is the first state, and a register value having a second value may indicate that the system information stored in the system memory 135 is the second state. Here, the first state may be a non-initialization state, and the second state may be an initialization state. For example, the first value may be '0' and the second value may be '1'. However, this is merely an embodiment and a value may be variously modified.

The system memory 135 may store the system information used for the operation of the memory device 100. Here, the system information may be the first state or the second state. Here, the first state may be the non-initialization state, and the second state may be the initialization state.

For example, the system memory 135 may store the default system information stored in the CAM block 111 therein as the system information during the initialization operation. At this time, the system information stored in the system memory 135 may be the second state. In addition, when the memory controller controls the memory device 100 to perform a specific operation, the memory controller 200 may adjust a value of a parameter related to the operation to another value as needed. That is, the system memory 135 may store system information updated from the default system information. At this time, the system information stored in the system memory 135 may be the first state.

In an embodiment, the memory controller 200 may include a processor 210.

When the second power Vccq of the memory controller 200 is turned on, the processor 210 may receive the register value from the memory device 100. The processor 210 may determine if the state of the system information is the first state or the second state according to the register value output from the register 133. Here, the first state is a state in which the system information stored in the system memory 135 of the memory device 100 is not the initialization state, and the second state is a state in which the system information stored in the system memory 135 of the memory device 100 is the initialization state.

When the received register value indicates that the system information is the first state, the processor 210 may control the memory device 100 to initialize the system information stored in the system memory 135.

Hereinafter, embodiments of the present disclosure are described in more detail with reference to the accompanying drawings.

Figure 2:
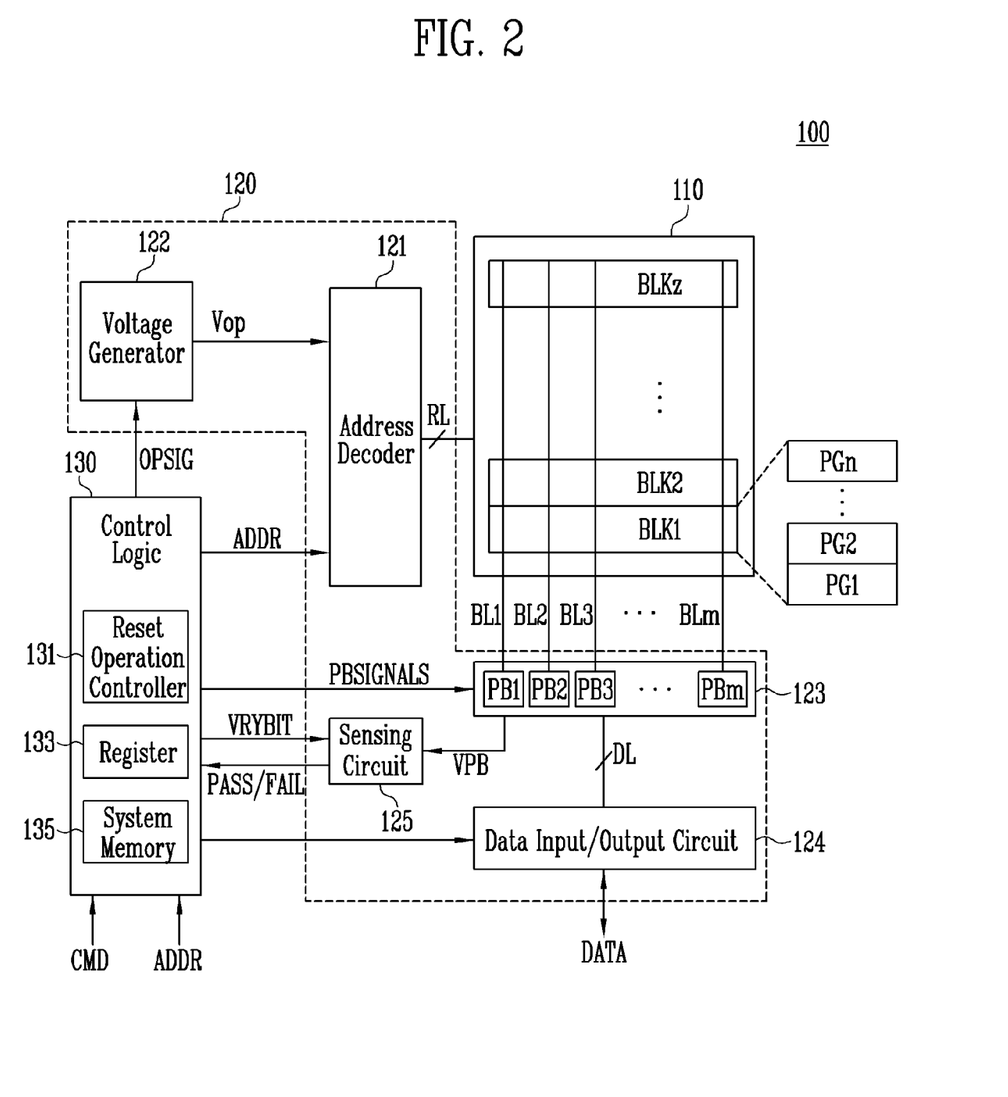
FIG. 2 is a diagram illustrating a memory device according to an embodiment of the present disclosure.

FIG. 2 is a diagram illustrating the memory device 100 according to an embodiment of the present disclosure.

Referring to FIG. 2, the memory device 100 may include a memory cell array 110, a peripheral circuit 120, and a control logic 130.

The memory cell array 110 may include a plurality of memory blocks BLK1 to BLKz. Each of the memory blocks BLK1 to BLKz may be configured in the same structure. Hereinafter, for convenience of description, the present disclosure is described based on the first memory block BLK1. A description of the first memory block BLK1 may be identically applied to other memory blocks.

The first memory block BLK1 may include a plurality of pages PG1 to PGn. Here, the first memory block BLK1 may be a non-volatile memory. Each of the pages PG1 to PGn may include memory cells. That is, the first memory block BLK1 may include a plurality of memory cells. For example, the pages PG1 to PGn may include memory cells of a unit on which the program operation of storing data or the read operation of reading stored data is performed. In addition, the first memory block BLK1 may include memory cells of a unit on which the erase operation of erasing data is performed. The plurality of memory cells may be arranged in a two-dimensional or three-dimensional structure.

The memory cells may be implemented in various types of non-volatile memory devices. For example, the memory cell may be implemented as a NAND flash memory or a NOR flash memory.

The memory cell may store data of a bit unit. For example, a threshold voltage of the memory cell may vary according to an amount of a stored charge. The threshold voltage of the memory cell may indicate a bit value of data stored in the memory cell. The threshold voltage of the memory cell may belong to one program state among a plurality of program states. Here, the number of program states may vary according to a data storage method. For example, one memory cell may store data according to various data storage methods such as a single level cell (SLC) capable of storing one bit of data, a multi-level cell (MLC) capable of storing two bits of data, and a triple level cell (TLC) capable of storing three bits of data, or a quad level cell (QLC) capable of storing four bits of data.

The first memory block BLK1 may be connected to a row line RL. Here, the row line RL may include a plurality of word lines. For example, gates of memory cells included in one page among the plurality of pages PG1 to PGn may be connected to one word line indicating a row unit. The first memory block BLK1 may be connected to a plurality of bit lines BL1 to BLm. For example, a source of a memory cell of the same column among a plurality of memory cells included in the first memory block may be connected to a drain of another memory cell of the same column. One end of the same column may be connected to one bit line indicating a column unit. Another end of the same column may be connected to a common source line.

The peripheral circuit 120 may operate under control of the control logic 130. For example, the peripheral circuit 120 may drive the memory cell array 110 to perform the program operation, the read operation, and the erase operation.

The peripheral circuit 120 may include an address decoder 121, a voltage generator 122, a read and write circuit 123, a data input/output circuit 124, and a sensing circuit 125.

The address decoder 121 may be connected to the memory cell array 110 through the row line RL. For example, the row line RL may include a drain select line, a plurality of word lines, a source select line, and a source line. For example, the address decoder 121 may include components such as a row decoder, a column decoder, and an address buffer.

The address decoder 121 may operate under control of the control logic 130. For example, the address decoder 121 may receive an address ADDR from the control logic 130. The address decoder 121 may decode a block address or a page address included in the received address ADDR. Here, the page address may indicate a row address. The address decoder 121 may apply an operation voltage Vop provided from the voltage generator 122 to a selection memory block determined by the block address among the memory blocks BLK1 to BLKz. The address decoder 121 may apply the operation voltage Vop provided from the voltage generator 122 to a selection page determined by the page address among pages included in the selection memory block determined by the block address. Here, the operation voltage Vop may include at least one of a program voltage, a verify voltage, a program pass voltage, a verify pass voltage, a read voltage, a read pass voltage, first and second erase voltages, and the like.

The voltage generator 122 may generate various types of operation voltages Vop using the first power Vcc supplied to the memory device 100. For example, the voltage generator 122 may generate the program voltage, the program verify voltage, the program pass voltage, the verify pass voltage, the read voltage, the read pass voltage, the erase voltage, and the like.

The voltage generator 122 may operate under control of the control logic 130. For example, when an operation signal OPSIG is received from the control logic 130, the voltage generator 122 may generate the operation voltage Vop corresponding to the operation signal OPSIG and transfer the operation voltage Vop to the address decoder 121. The voltage generator 122 may generate a voltage of a level corresponding to the parameter stored in the system memory 135.

The read and write circuit 123 may include a plurality of page buffers PB1 to PBm. Each of the plurality of page buffers PB1 to PBm may be connected to the memory cell array 110 through a corresponding bit line among the plurality of bit lines BL1 to BLm. For example, each of the plurality of page buffers PB1 to PBm may be commonly connected to memory cells indicating a specific column among the memory cells included in each of the plurality of memory blocks BLK1 to BLKz through one bit line. Each of the plurality of page buffers PB1 to PBm may temporarily store data DATA. To this end, each of the plurality of page buffers PB1 to PBm may be implemented with various memory circuits such as a latch circuit.

The read and write circuit 123 may operate under control of the control logic 130. For example, when a buffer control signal PBSIGNALS is received from the control logic 130, the read and write circuit 123 may apply a voltage corresponding to the data DATA to the memory cell array 110 through the plurality of bit lines BL1 to BLm, or read the data DATA stored in the memory cell array 110 through the plurality of bit lines BL1 to BLm.

The data input/output circuit 124 may be connected to the read and write circuit 123 through a data line DL. The data input/output circuit 124 may include a plurality of input/output buffers receiving the input data DATA. The data input/output circuit 124 may operate in response to a control signal of the control logic 130. For example, when the control signal of the control logic 130 is received, the data input/output circuit 124 may transfer the data DATA to the read and write circuit 123 through the data line DL or output the data DATA to the memory controller 120 through a channel.

The sensing circuit 125 may generate a reference voltage in response to an allowable bit signal VRYBIT received from the control logic 130. The sensing circuit 125 may output a pass signal PASS or a fail signal FAIL to the control logic 130 according to a result of comparing a sensing voltage VPB received from the read and write circuit 123 with a reference voltage. Here, the pass signal PASS may indicate that a program pulse operation or the read operation is passed. The fail signal FAIL may indicate that the program pulse operation or the read operation is failed.

The control logic 130 may control an overall operation of the memory device 110. The control logic 130 may control the peripheral circuit 120 to perform the program operation, the read operation, or the erase operation according to a command CMD and an address ADDR received from the memory controller 120. Here, the command CMD may be a program command, a read command, or an erase command. To this end, the control logic 130 may be connected to the peripheral circuit 120. For example, the control logic 130 may be connected to the address decoder 121, the voltage generator 122, the read and write circuit 123, the data input/output circuit 124, and the sensing circuit 125.

In an embodiment, the memory cell array 110 may include at least one CAM block 111. For example, each of the memory blocks BLK1 to BLKz may be the CAM block 111 or a user block. The CAM block 111 may be a memory block that stores the default system information, and the user block may be a memory block that stores user data received from the host 300. The CAM block 111 may store the default system information of the memory device 100. In addition, the CAM block 111 may further store at least one piece of information among a program/erase cycle for each memory block, algorithm information, and bad block information.

In an embodiment, the control logic 130 may include the reset operation controller 131, the register 133, and the system memory 135. However, this is merely an embodiment, and each of the reset operation controller 131, the register 133, and the system memory 135 may be modified and implemented to be positioned inside or outside the control logic 130.

When a first reset command is received from the memory controller 200, the reset operation controller 131 may determine whether to perform the initialization operation according to a past reception history of the first reset command. For example, the first reset command may be FFh. Here, the initialization operation may be an operation of initializing the system information stored in the system memory 135. For example, the initialization operation may be an operation of storing the default system information, which is stored in the CAM block 111, in the system memory 135 as the system information.

To this end, when the first reset command is received from the memory controller 200, the reset operation controller 131 may store history information indicating that past reception history of the first reset command exists in the system memory 135. Thereafter, when the first reset command is received from the memory controller 200, the reset operation controller 131 may search for history information in the system memory 135 to identify whether the past reception history of the first reset command exists.

The reset operation controller 131 may not perform the initialization operation when the past reception history of the first reset command exists. This indicates that the first reset command is received again after the first reset command is initially received. In an embodiment, when the past reception history of the first reset command exists, the reset operation controller 131 may stop an operation that is currently being performed and enter a standby state. In an embodiment, when the past reception history of the first reset command exists, the reset operation controller 131 may set a first value indicating the non-initialization state as the register value and store the first value in the register 133. For example, the first value may be '0' (i.e., a logic low level).

Meanwhile, when the past reception history of the first reset command does not exist, the reset operation controller 131 may perform the initialization operation. This indicates that the first reset command is initially received. In addition, the reset operation controller 131 may set the second value indicating the initialization state as the register value and store the second value in the register 133. For example, the second value may be '1' (a logic high level).

When a second reset command is received from the memory controller 200, the reset operation controller 131 may perform the initialization operation. The second reset command may have a different type from the first reset command. The second reset command may be a command for controlling to perform the initialization operation regardless of whether or not the second reset command is initially received. For example, the second reset command may be CAM reset CMD. In addition, the reset operation controller 131 may set the second value indicating the initialization state as the register value and store the second value in the register 133. For example, the second value may be '1'.

The register 133 may store the register value indicating whether the system information stored in the system memory 135 is the initialization state. The register 133 may output the register value when a register read command is received from the memory controller 200. For example, the register read command may be Get Parameter CMD. Here, outputting the register value may mean outputting a signal such as a voltage having a first level or a second level.

The system memory 135 may store the system information used for an operation. In an embodiment, the system memory 135 may be volatile memory. The system memory 135 may be implemented as a dynamic RAM (DRAM), a static RAM (SRAM), or the like.

Figure 3:
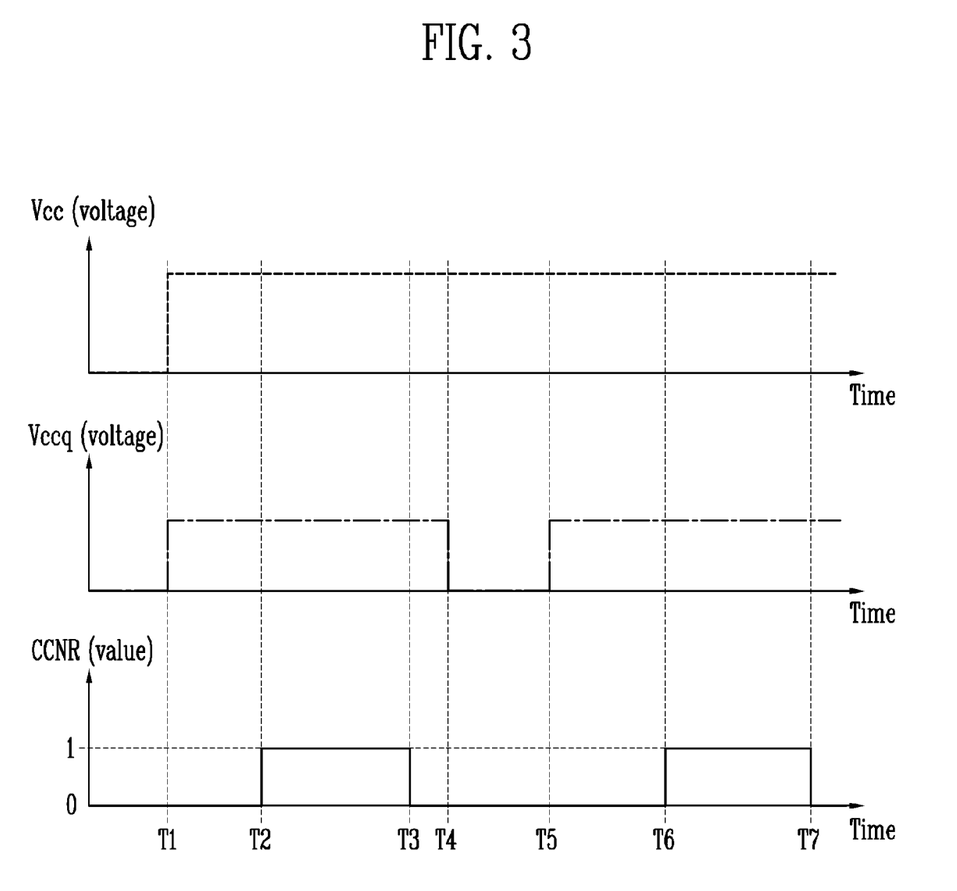
FIG. 3 is a diagram illustrating power and a register value according to an embodiment of the present disclosure.

FIG. 3 is a diagram illustrating power and a register value according to an embodiment of the present disclosure. FIG. 3 illustrates that the first power Vcc supplied to the memory device 100, the second power Vccq supplied to the memory controller 200, and the register value CCNR change with time.

Referring to FIG. 3, before a first time T1, the first power Vcc and the second power Vccq may be in an off state, and at the first time T1, the first power Vccq and the second power Vccq may be changed to an on state by the host 300. At this time, the memory controller 200 may perform a booting operation.

In addition, at a second time T2, the memory controller 200 may transmit the first reset command to the memory device 100. When the first reset command is received, the memory device 100 may determine that the first reset command is initially received and perform the initialization operation. In this case, the default system information stored in the CAM block 111 may be loaded into the system memory 135. In addition, the memory device 100 may set the register value CCNR to the second value. For example, the second value may be '1'. Meanwhile, when the memory controller 200 confirms that the register value CCNR is the second value, the memory controller 200 may not transmit the second reset command to the memory device 100.

In addition, at a third time T3, the memory controller 200 may control the memory device 100 to perform a specific operation. For example, the memory controller 200 may control the memory device 100 to perform the program operation. In this case, the memory controller 200 may transmit a command for controlling to adjust parameters related to the program operation stored in the system memory 135 according to the number of program/erase cycles, to the memory device 100. In this case, the memory device 100 may adjust the parameters related to the program operation stored in the system memory 135 and set the register value CCNR to the first value. For example, the first value may be '0'.

In addition, at a fourth time T4, a voltage supplied to the memory controller 200 may become unstable. At this time, the second power Vccq may be changed to the off state, and the first power Vcc may continuously maintain the on state.

In addition, at a fifth time T5, when a reason of voltage instability or the like is resolved, the second power Vccq may be changed to the on state. At this time, the memory controller 200 may perform the booting operation.

In addition, the memory controller 200 may transmit the first reset command to the memory device 100. When the first reset command is received, the memory device 100 may determine that the first reset command is not initially received and may not perform the initialization operation.

In addition, at a sixth time T6, when the memory controller 200 confirms that the register value CCNR is the first value, the memory controller 200 may transmit the second reset command to the memory device 100. When the second reset command is received, the memory device 100 may perform the initialization operation. In this case, the default system information stored in the CAM block 111 may be loaded into the system memory 135. In addition, the memory device 100 may set the register value CCNR to the second value. Thereafter, at a seventh time T7, the memory device 100 may adjust the parameters related to the program operation, stored in the system memory 135, under control of the memory controller 200 and set the register value CCNR to the first value.

According to an embodiment of the present disclosure as described above, the memory controller 200, the memory device 100, and the storage device 1000 including the same preventing an error of the booting operation may be provided. The memory controller 200 may accurately and quickly recognize whether the memory device 100 is in the initialization state. Accordingly, a problem that may occur due to the memory controller 200 recognizing a state different from an actual state of the memory device 100 may be prevented. In addition, since the memory controller 200 may control the memory device 100 to perform the initialization operation only in a necessary situation, an unnecessary initialization operation may be prevented, and thus power efficiency and latency efficiency of the memory device 100 may be improved.

Figure 4:
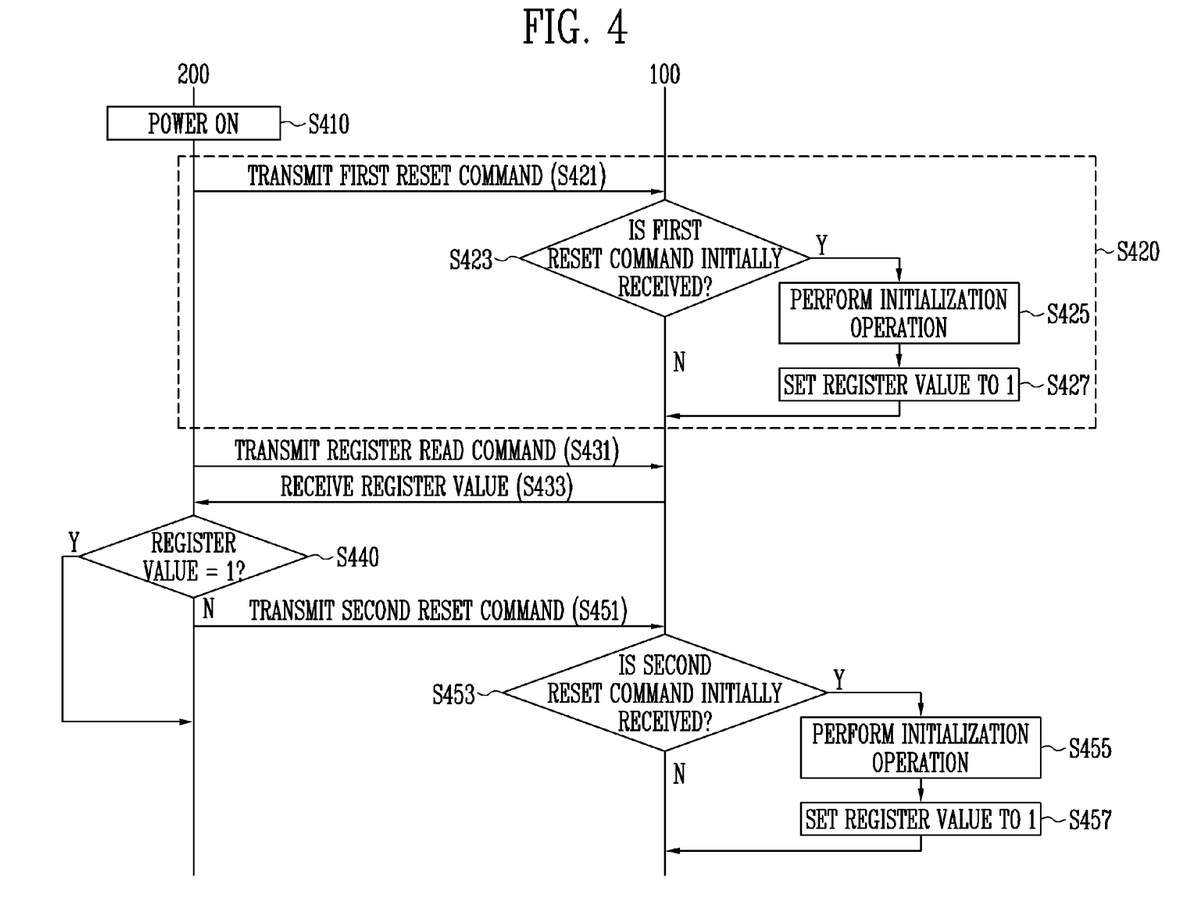
FIG. 4 is a diagram illustrating an initialization operation of a storage device according to an embodiment of the present disclosure.

FIG. 4 is a diagram illustrating an initialization operation of a storage device according to an embodiment of the present disclosure.

Referring to FIG. 4, the memory controller 200 may perform the booting operation when the second power Vccq is turned on (S410). In addition, the memory controller 200 may transmit the first reset command to the memory device 100 (S421).

When the first reset command is received, the memory device 100 may determine whether the first reset command is initially received (S423). To this end, the memory device 100 may search for the history information in the system memory 135 and determine whether the past reception history of the first reset command exists. When it is determined that the first reset command is initially received (S423, Y), the memory device 100 may perform the initialization operation (S425) and set the register value to '1' (S427). Here, '1' indicates that the system information is the initialization state. Meanwhile, when it is determined that the first reset command is not initially received (S423, N), the memory device 100 may not perform the initialization operation. In an embodiment, the memory device 100 may set the register value to '0'. Here, '0' indicates that the system information is not the initialization state.

According to an embodiment of the present disclosure, operations S420 including a transmission operation of the first reset command (S421) to a setting operation of the register value (S427) may be omitted.

In addition, the memory controller 200 may transmit the register read command to the memory device 100 (S431). When the register read command is received, the memory device 100 may output the register value stored in the register 133 to the memory controller 200. The memory controller 200 may receive the register value in response to the register read command (S433).

When the received register value is '1' (S440, Y), the memory controller 200 may determine that the system information stored in the system memory 135 of the memory device 100 is the initialization state. In addition, the memory controller 200 may end the booting operation. When the second reset command is not received from the memory controller 200 (S453, N), the memory device 100 may not perform the initialization operation.

When the received register value is not '1' (S440, N), the memory controller 200 may determine that the system information stored in the system memory 135 of the memory device 100 is not the initialization state. For example, when the received register value is '0', the memory controller 200 may determine that the system information is not the initialization state. In addition, the memory controller 200 may transmit the second reset command to the memory device 100 (S451). When the second reset command is received from the memory controller 200 (S453, Y), the memory device 100 may perform the initialization operation (S455) and set the register value to '1' (S457).

Figure 5:
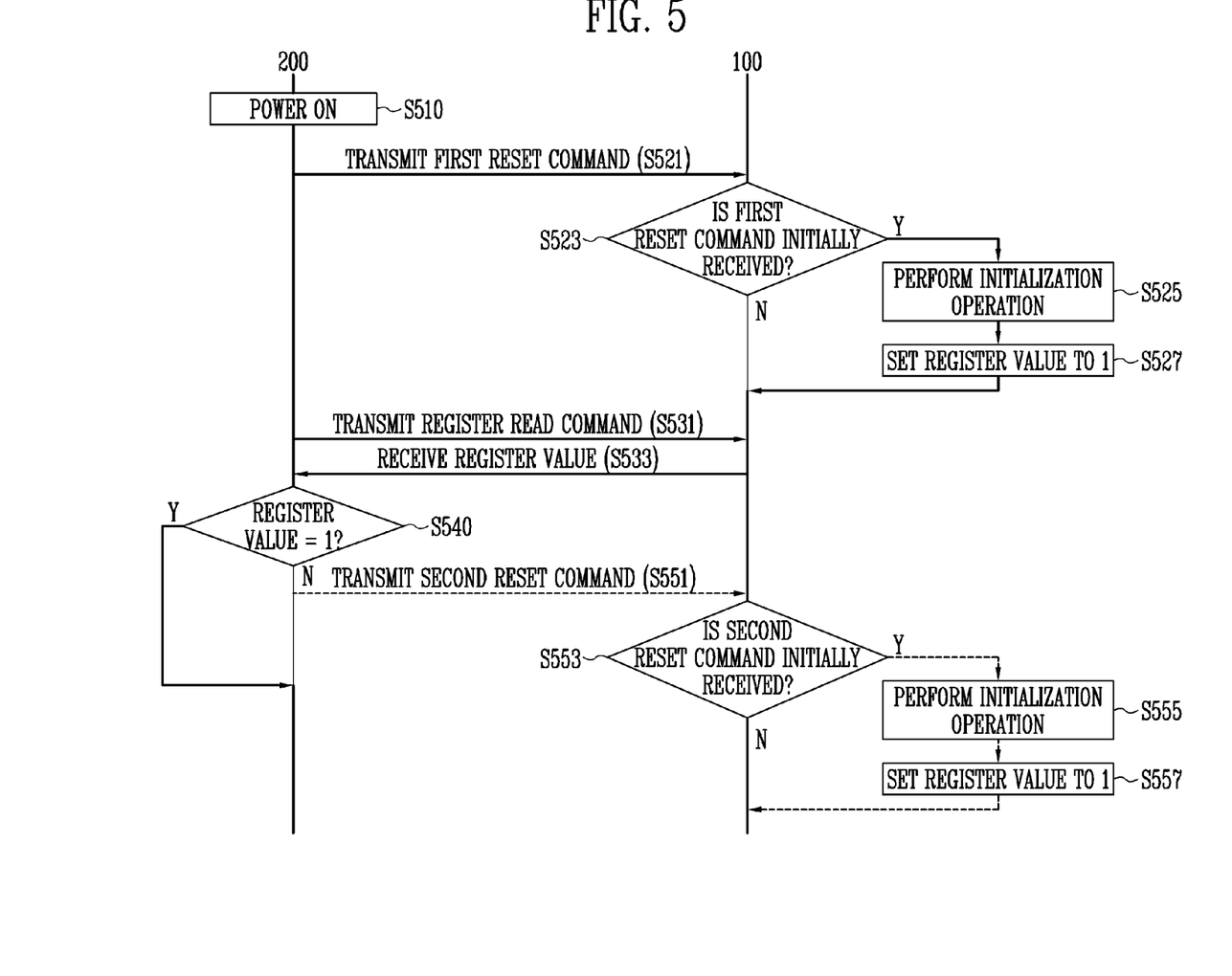
FIG. 5 is a diagram illustrating an initialization operation according to a first reset command according to an embodiment of the present disclosure.

FIG. 5 is a diagram illustrating an initialization operation according to a first reset command according to an embodiment of the present disclosure. FIG. 5 may illustrate an operation corresponding to the first time T1 to the second time T2 of FIG. 3.

Referring to FIG. 5, when the second power Vccq is turned on (S510), the memory controller 200 may transmit the first reset command to the memory device 100 (S521).

When the first reset command is received, the memory device 100 may determine that the first reset command is initially received in a case where the past reception history does not exist (S523, Y). In this case, the memory device 100 may perform the initialization operation (S525). In addition, the memory device 100 may set the register value to the second value (S527). Here, the second value may indicate the initialization state. For example, the second value may be '1'.

The memory controller 200 may transmit the register read command to the memory device 100 when a reference time elapses from a time point at which the first reset command is transmitted (S531). The memory controller 200 may receive the register value from the memory device 100 (S533).

When the memory controller 200 confirms that the register value is '1' (S540, Y), the memory controller 200 may end the booting operation without transmitting the second reset command to the memory device 100. In this case, when the second reset command is not received (S553, N), the memory device 100 may not perform the initialization operation.

Figure 6:
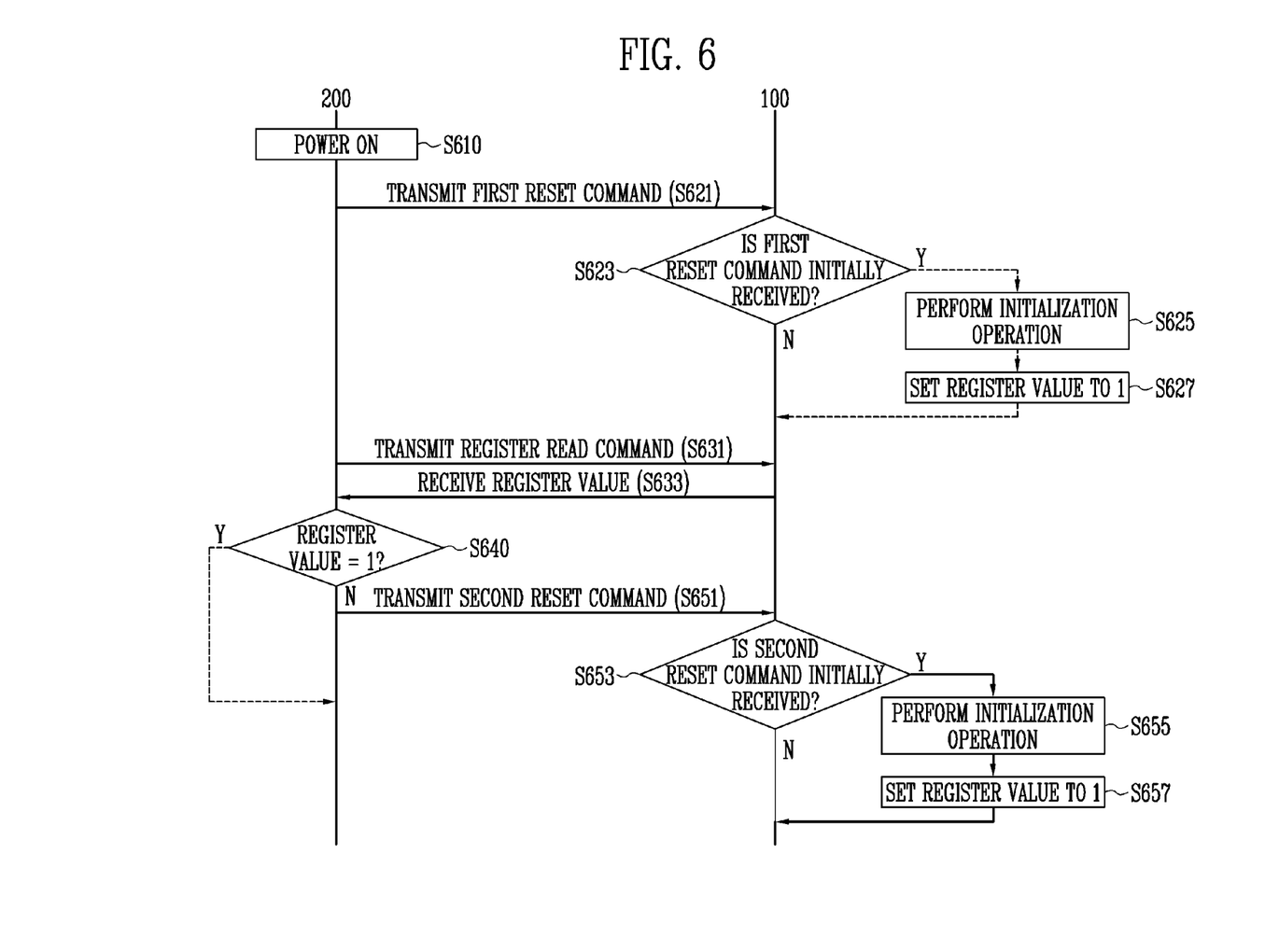
FIG. 6 is a diagram illustrating an initialization operation according to a second reset command according to an embodiment of the present disclosure.

FIG. 6 is a diagram illustrating an initialization operation according to a second reset command according to an embodiment of the present disclosure. FIG. 6 may illustrate an operation corresponding to the fifth time T5 to the sixth time T6 of FIG. 3.

Referring to FIG. 6, when the second power Vccq is turned on (S610), the memory controller 200 may transmit the first reset command to the memory device 100 (S621).

When the first reset command is received, the memory device 100 may determine that the first reset command is not initially received in a case where the past reception history exists (S623, N). In this case, the memory device 100 may not perform the initialization operation. In an embodiment, the memory device 100 may set the register value to the first value. Here, the first value may indicate the non-initialization state. For example, the first value may be '0'.

The memory controller 200 may transmit the register read command to the memory device 100 when a reference time elapses from a time point at which the first reset command is transmitted (S631). The memory controller 200 may receive the register value from the memory device 100 (S633).

When the memory controller 200 confirms that the register value is not '1' (S640, N), the memory controller 200 may transmit the second reset command to the memory device 100 (S651). In this case, when the second reset command is received (S653, Y), the memory device 100 may perform the initialization operation (S655). In addition, the memory device 100 may set the register value to '1' (S657).

Figure 7:
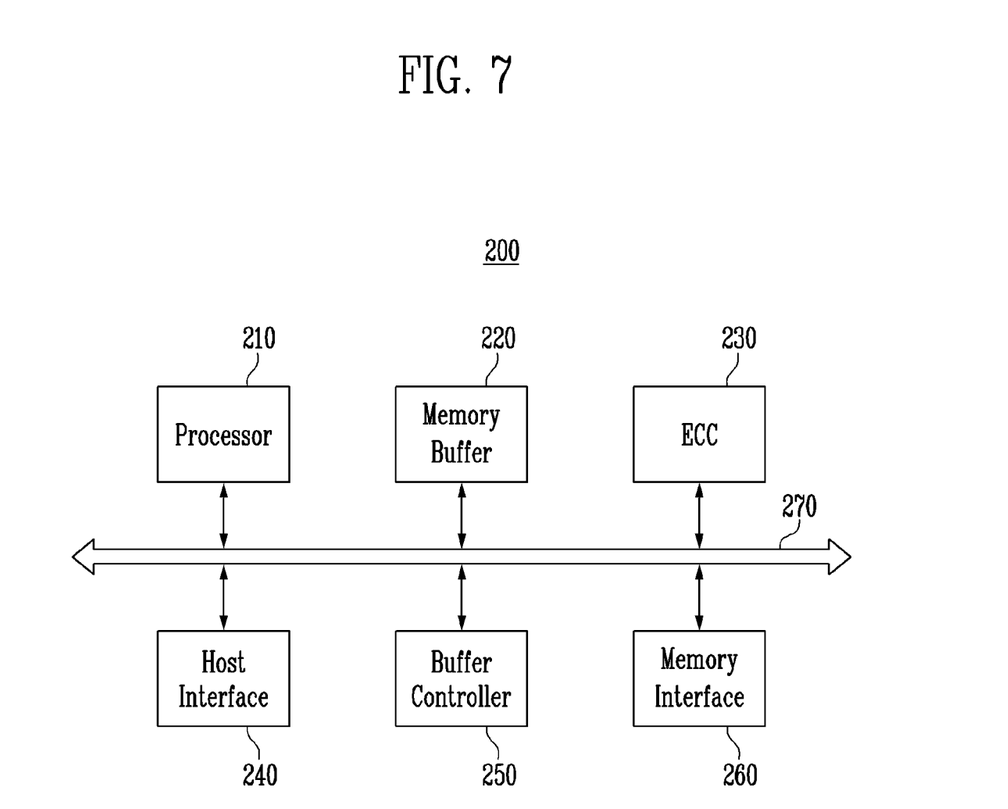
FIG. 7 is a diagram illustrating a memory controller according to an embodiment of the present disclosure.

FIG. 7 is a diagram illustrating the memory controller 200 according to an embodiment of the present disclosure.

Referring to FIG. 7, the memory controller 200 may include a processor 210, a memory buffer 220, an error correction circuit (ECC) 230, a host interface 240, a buffer controller 250, and a memory interface 260.

The processor 210 may control operations of the other components in the memory controller 200. The processor 210 may perform a logical operation. The processor 210 may communicate with the host 300 through the host interface 240 and communicate with the memory device 100 through the memory interface 260. In addition, the processor 210 may communicate with the memory buffer 220 through the buffer controller 250. The processor 210 may use the memory buffer 220 as an operation memory or a cache memory.

The processor 210 may perform a function of a flash translation layer (FTL). The processor 210 may convert a logical block address (LBA) provided by the host 300 into a physical block address (PBA) through FTL. The FTL may receive the LBA using a mapping table and convert the LBA into a physical block address (PBA). The mapping table may be stored in the memory buffer 220.

In an embodiment, while the power voltage of the memory device 100 is maintained as the on state, when the power of the memory controller 200 is changed from the off state to the on state, the processor 210 may control the memory interface 260 to transmit the first reset command. Here, whether the first reset command is initially received, and whether to perform the initialization operation of the memory device 100 may vary.

In an embodiment, while the power voltage of the memory device 100 is maintained as the on state, when the power of the memory controller 200 is changed from the off state to the on state, the processor 210 may control the memory interface 260 to transmit the register read command. The processor 210 may receive the register value from the memory device 100 through the memory interface 260.

The processor 210 may determine whether the system information is the initialization state according to the received register value. When it is determined that the system information is not the initialization state, the processor 210 may control the memory interface 260 to transmit the second reset command to the memory device 100. Here, the second reset command may be a command for initializing the system information stored in the system memory 135.

In an embodiment, when it is determined that the system information is not the initialization state according to the register value received after transmitting the first reset command, the processor 210 may control the memory interface 260 to transmit the second reset command to the memory device 100.

In an embodiment, when it is determined that the system information is the initialization state according to the register value received after transmitting the first reset command, the processor 210 may control the memory interface 260 so as not to transmit the second reset command to the memory device 100.

The memory buffer 220 may temporarily store data transmitted between the host 300 and the memory device 100 and may serve as an operation memory or a cache memory of the processor 210. The memory buffer 220 may be a static RAM (SRAM) or a dynamic RAM (DRAM). The memory buffer 220 may store an instruction executed by the processor 210 and data processed by the processor 210.

The ECC 230 may perform error correction. The ECC 230 may perform error correction encoding based on data to be stored in the memory device 100. Error correction encoded data may be transmitted to the memory device 100 through the memory interface 260. The ECC 230 may perform error correction decoding on data received from the memory device 100 through the memory interface 260.

The host interface 240 may communicate with the host 300 under control of the processor 210. The host interface 240 may be configured to communicate using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 250 may control the memory buffer 220. The buffer controller 250 may store data in the memory buffer 220 and delete data stored in the memory buffer 220.

The memory interface 260 may communicate with the memory device 100. To this end, the memory interface 260 may be connected to the memory device 100 through a channel. The memory interface 260 may transmit data to the memory device 100 and may receive data from the memory device 100. The memory interface 260 may receive the register value output from the register 133 of the memory device 100.

A bus 270 may function as an internal channel through which configurations of the memory controller 200 may communicate with each other.

Figure 8:
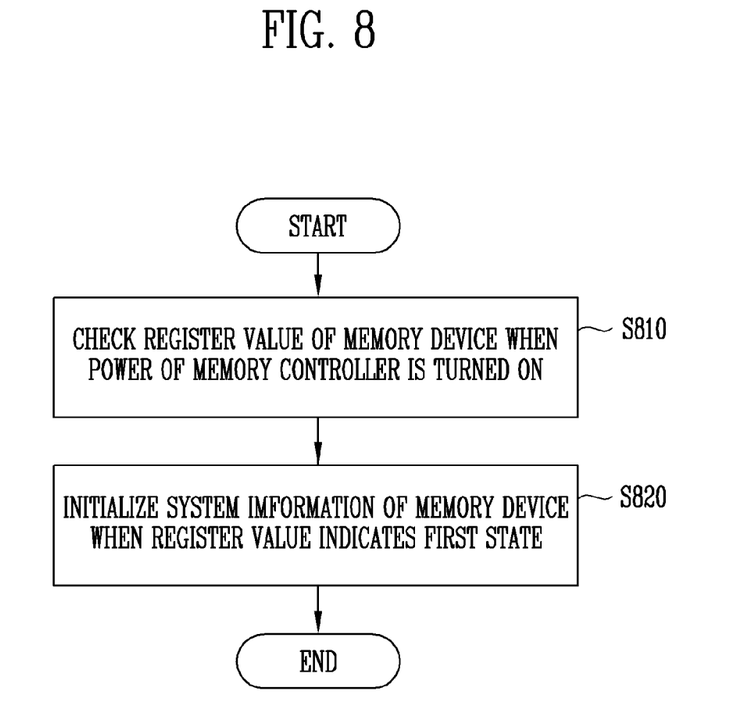
FIG. 8 is a diagram illustrating a method of operating a storage device according to an embodiment of the present disclosure.

FIG. 8 is a diagram illustrating a method of operating a storage device according to an embodiment of the present disclosure.

Referring to FIG. 8, when the power of the memory controller 200 is turned on, the register value of the memory device 100 may be checked (S810). The register value may be a value indicating the first state or the second state. The first state may indicate that the system information stored in the system memory 135 of the memory device 100 is not the initialization state, and the second state may indicate that the system information stored in the system memory 135 of the memory device 100 is the initialization state.

When the register value indicates the first state, the memory controller 200 may control the memory device 100 to initialize the system information of the memory device 100 (S820). For example, the memory controller 200 may transmit the second reset command to the memory device 100.

Figure 9:
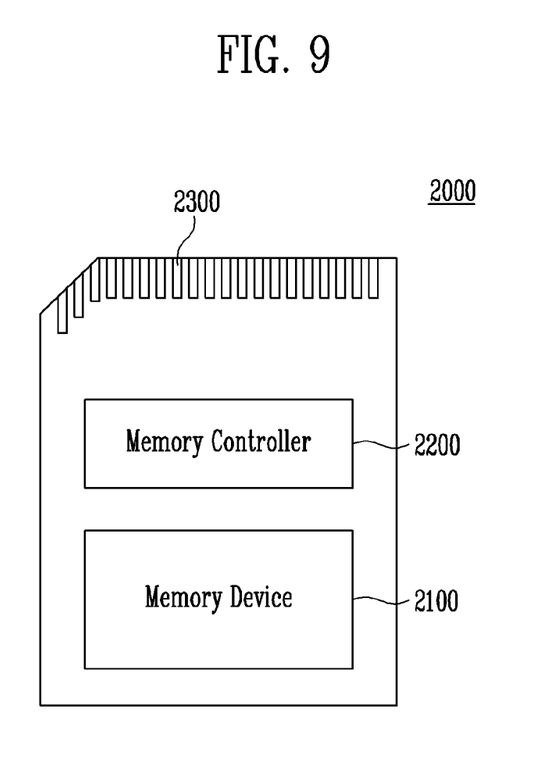
FIG. 9 is a block diagram illustrating a memory card to which a storage device is applied according to an embodiment of the present disclosure.

FIG. 9 is a block diagram illustrating a memory card 2000 to which a storage device is applied according to an embodiment of the present disclosure.

Referring to FIG. 9, the memory card 2000 may include a memory device 2100, a memory controller 2200, and a connector 2300.

The memory device 2100 may perform a program operation of storing data, a read operation of reading data, and an erase operation of erasing data. The memory device 2100 may be implemented with various non-volatile memory devices. The description of the memory device 100 described with reference to FIG. 1 and the like may be identically applied to the memory device 2100.

The memory controller 2200 may communicate with an external device through the connector 2300. The memory controller 2200 may communicate with an external device (for example, a host) according to a specific communication standard. For example, the memory controller 2200 may transfer data, a command, or the like through communication between the memory device 2100 or the host 300. The memory controller 2200 may control the memory device 2100. The memory controller 2200 may control the memory device 2100 to perform the program operation, the read operation, and the erase operation. The description of the memory controller 200 described with reference to FIG. 1 and the like may be identically applied to the memory controller 2200.

The memory device 2100 and the memory controller 2200 may be integrated into one semiconductor device to configure a memory card. For example, the memory device 2100 and the memory controller 2200 may be integrated into one semiconductor device, and may be manufactured in a type of a memory card such as a personal computer memory card international association (PCMCIA), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage device (UFS).

Figure 10:
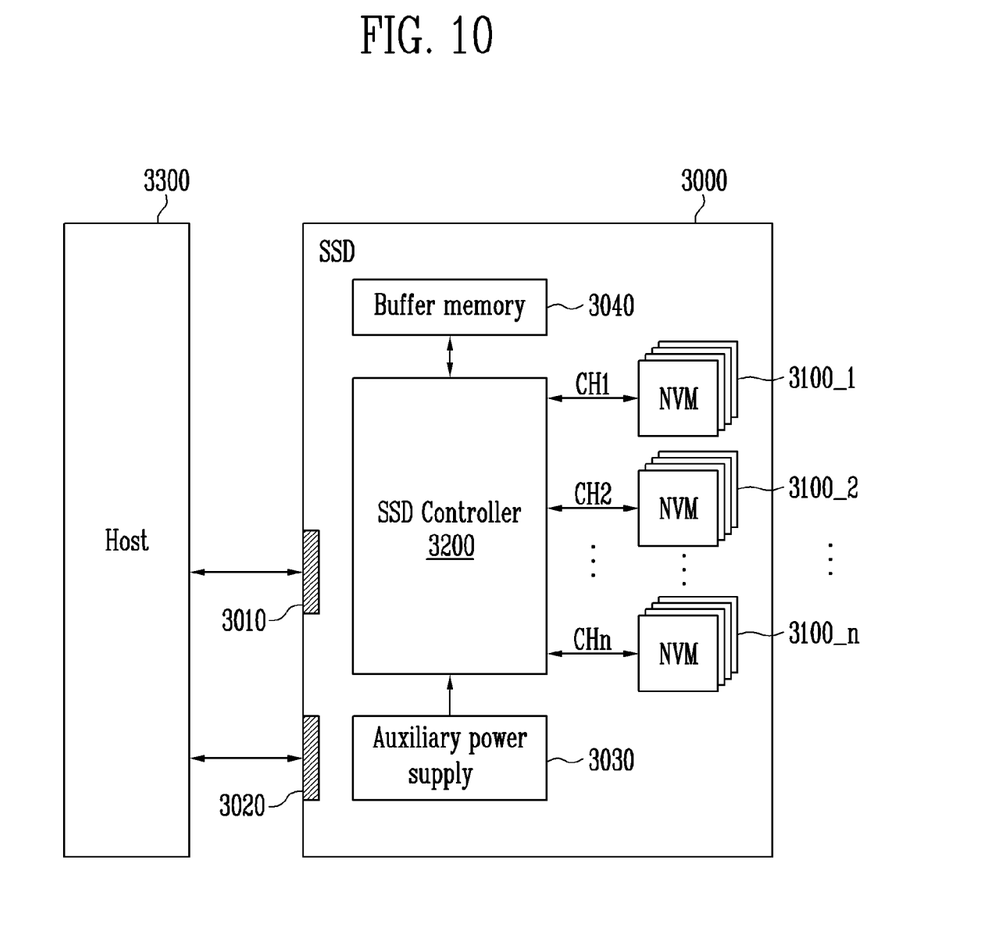
FIG. 10 is a block diagram illustrating a solid state drive (SSD) to which a storage device is applied according to an embodiment of the present disclosure.

FIG. 10 is a block diagram illustrating a solid state drive (SSD) 3000 to which a storage device is applied according to an embodiment of the present disclosure.

Referring to FIG. 10, the SSD 3000 may include a plurality of non-volatile memory devices 3100_1 to 3100_n, an SSD controller 3200, a signal connector 3010, a power connector 3020, an auxiliary power supply 3030, and a buffer memory 3040.

The SSD 3000 may communicate with a host 3300 through the signal connector 3010. The signal connector 3010 may be implemented in a form of an interface according to various communication methods. For example, the signal connector 3010 may be one of interfaces according to various communication methods, such as a serial ATA (SATA) interface, a mini-SATA (mSATA) interface, a PCI express (PCIe) interface, and an M.2 interface.

A plurality of first non-volatile memory devices 3100_1 may be connected to the SSD controller 3200 through a first channel CH1, a plurality of second non-volatile memory devices 3100_2 may be connected to the SSD controller 3200 through a second channel CH2, and a plurality of n-th non-volatile memory devices 3100_n may be connected to the SSD controller 3200 through an n-th channel CHn. Accordingly, the SSD controller 3200 may perform communication in parallel with the non-volatile memory devices connected through channels independent of each other.

The description of the memory device 110 described with reference to FIG. 1 and the like may be identically applied to each of the plurality of non-volatile memory devices 3100_1 to 3100_n. The description of the memory controller 200 described with reference to FIG. 1 and the like may be identically applied to the SSD controller 3200. Hereinafter, a repetitive description is omitted.

The SSD 3000 may receive external power from the host 3300 through the power connector 3020. The auxiliary power supply 3030 may be connected to the host 3300 through the power connector 3020. The auxiliary power supply 3030 may receive power from the host 3300 and charge the power. The auxiliary power supply 3030 may provide power of the SSD 3000 when power supply from the host 3300 is not smooth. The auxiliary power supply 3030 may be positioned inside the SSD 3000 or outside the SSD 3000. For example, the auxiliary power supply 3030 may be positioned on a main board and may provide auxiliary power to the SSD 3000.

The buffer memory 3040 may temporarily store data. For example, the buffer memory 3040 may temporarily store data received from the host 3300 or data received from the plurality of non-volatile memory devices 3100_1 to 3100_n, or temporarily store meta data (for example, a mapping table) of the non-volatile memory devices 3100_1 to 3100_n. In an embodiment, the buffer memory 3040 may be a volatile memory device such as a DRAM. However, this is merely an embodiment, and the buffer memory 3040 may be implemented as a non-volatile memory device.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A storage device comprising:
a memory device including a system memory configured to store system information used for operations of the memory device, and a register configured to store a register value indicating whether the system information is a first state or a second state; and
a memory controller configured to receive the register value from the memory device when power is turned on, and control the memory device to initialize the system information stored in the system memory when the received register value indicates that the system information is the first state,
wherein in a state where a power voltage of the memory device is in an on state, when the power of the memory controller is changed from an off state to an on state, the memory controller is configured to transmit a first reset command to the memory device,
wherein the memory device includes a reset operation controller configured to determine whether to perform an initialization operation of initializing the system information according to a past reception history of the first reset command, when the first reset command is received from the memory controller, and
wherein when the past reception history exists, the reset operation controller is configured to set the register value to indicate that the system information is the first state.

2. The storage device of claim 1, wherein in a state where a power voltage of the memory device is in an on state, when the power of the memory controller is changed from an off state to an on state, the memory controller is configured to transmit a register read command to the memory device and receive the register value from the memory device.

3. The storage device of claim 1, wherein when the received register value indicates that the system information is the first state after transmitting the first reset command, the memory controller is configured to transmit a second reset command to the memory device.

4. The storage device of claim 3, wherein the memory device further comprises:
a CAM block configured to store default system information corresponding to an initialization state of the system information; and
a reset operation controller configured to store, in the system memory as the system information, the default system information stored in the CAM block when the second reset command is received from the memory controller.

5. The storage device of claim 4, wherein when the second reset command is received, the reset operation controller is configured to store the default system information, in the system memory as the system information and set the register value to indicate that the system information is the second state.

6. The storage device of claim 3, wherein when the received register value indicates that the system information is the second state, the memory controller is configured not to transmit the second reset command to the memory device.

7. The storage device of claim 1,
wherein the memory device further comprises a CAM block configured to store default system information corresponding to an initialization state of the system information, and
wherein the reset operation controller stores, in the system memory as the system information, the default system information stored in the CAM block and set the register value to indicate that the system information is the second state, when the past reception history does not exist.

8. A memory device comprising:
a system memory configured to store system information used for operations of the memory device;
a register configured to output a register value indicating whether the system information is in an initialization state in response to a register read command; and
a reset operation controller configured to
determine whether to perform an initialization operation of initializing the system information stored in the system memory according to a past reception history of a first reset command when the first reset command is received from the memory controller, and
perform the initialization operation when a second reset command is received from the memory controller after a first value indicating that the system information is not in the initialization state is output as the register value,
wherein when the past reception history does not exist, the reset operation controller is configured to perform the initialization operation and set the register value to a second value, and
wherein when the past reception history exists, the reset operation controller is configured to set the register value to the first value.

9. The memory device of claim 8, further comprising a CAM block is configured to store default system information corresponding to the initialization state of the system information,
wherein when the initialization operation is performed, the reset operation controller is configured to store the default system information as the system information in the system memory and set the register value to a the second value indicating that the system information is the initialization state.

* * * * *